United States Patent
Jensen et al.

(10) Patent No.: US 9,430,560 B2
(45) Date of Patent: Aug. 30, 2016

(54) EARNED MEDIA GENERATION

(71) Applicant: ZEFR, Inc., Venice, CA (US)

(72) Inventors: Trygve J. Jensen, Provo, UT (US); Brock C. Luker, Provo, UT (US); Neal W. Williams, Highland, UT (US)

(73) Assignee: ZEFR, INC., Venice, CA (US)

( * ) Notice: Subject to any disclaimer, the term of this patent is extended or adjusted under 35 U.S.C. 154(b) by 167 days.

(21) Appl. No.: 13/962,830

(22) Filed: Aug. 8, 2013

(65) Prior Publication Data

US 2014/0046966 A1 Feb. 13, 2014

Related U.S. Application Data

(60) Provisional application No. 61/681,464, filed on Aug. 9, 2012.

(51) Int. Cl.
*G06F 17/30* (2006.01)
*G06Q 30/02* (2012.01)

(52) U.S. Cl.
CPC ..... *G06F 17/30699* (2013.01); *G06F 17/3089* (2013.01); *G06F 17/30867* (2013.01); *G06Q 30/0241* (2013.01)

(58) Field of Classification Search
CPC ............. G06Q 30/02; G06Q 30/0241; G06Q 30/0251; G06Q 30/0277; G06F 17/30864
USPC ................... 707/709, 636, 754, 707, 732; 705/14.43, 14.67, 14.39, 14.16, 14.19, 705/14.51, 14.14, 27.1, 14.48, 14.44, 14.29, 705/14.33
See application file for complete search history.

(56) References Cited

U.S. PATENT DOCUMENTS

| | | | |
|---|---|---|---|
| 6,983,479 B1 * | 1/2006 | Salas et al. | 725/23 |
| 7,366,787 B2 * | 4/2008 | Salas et al. | 709/229 |
| 7,574,408 B2 * | 8/2009 | Dominowska et al. | 705/408 |
| 8,190,711 B1 | 5/2012 | Borodich | |
| 8,639,566 B2 * | 1/2014 | Yankelevich et al. | 705/14.1 |
| 8,856,019 B2 * | 10/2014 | Marchese | G06Q 20/10 705/7.29 |
| 2003/0074258 A1 * | 4/2003 | Pan | 705/14 |
| 2004/0193499 A1 * | 9/2004 | Ortiz et al. | 705/17 |
| 2008/0033776 A1 * | 2/2008 | Marchese | G06Q 20/10 705/7.33 |
| 2008/0243605 A1 * | 10/2008 | Burger | 705/14 |
| 2009/0150920 A1 * | 6/2009 | Jones | G06Q 30/02 725/23 |
| 2009/0234737 A1 * | 9/2009 | Sarelson | G06Q 30/02 705/14.13 |
| 2010/0070485 A1 * | 3/2010 | Parsons et al. | 707/709 |

(Continued)

FOREIGN PATENT DOCUMENTS

WO WO 2013190366 A1 * 12/2013 ........... H04N 21/258

*Primary Examiner* — Frantz Coby
(74) *Attorney, Agent, or Firm* — Kunzler Law Group; Scott D. Thorpe (57) ABSTRACT

An illustrative method for generating earned media includes collecting publisher descriptor data from a plurality of publishers, storing the descriptor data in a computer-readable memory, gathering at least one marketing parameter from a marketer and storing the at least one marketing parameter on the computer-readable memory. The method further includes retrieving, with a computing device, the descriptor data and the at least one marketing parameter from the computer-readable memory and filtering the plurality of publishers by applying the at least one marketing parameter to the descriptor data to produce qualified publishers. The qualified publishers are then presented with content from the marketer for dissemination to an audience of the qualified publishers. A system for generating earned media is also presented.

20 Claims, 3 Drawing Sheets

(56) References Cited

U.S. PATENT DOCUMENTS

| | | |
|---|---|---|
| 2010/0145777 A1 | 6/2010 | Ghosh et al. |
| 2010/0180186 A1* | 7/2010 | Skinner et al. ............... 715/205 |
| 2011/0015977 A1* | 1/2011 | Nagao ........................ 705/14.14 |
| 2011/0230213 A1* | 9/2011 | Shah et al. .................... 455/466 |
| 2011/0231290 A1* | 9/2011 | Narcisse et al. ............. 705/27.1 |
| 2012/0158455 A1 | 6/2012 | Pathak et al. |
| 2012/0158477 A1* | 6/2012 | Tennenholtz et al. ..... 705/14.19 |
| 2012/0226602 A1* | 9/2012 | Narcisse et al. ................ 705/39 |
| 2012/0300087 A1* | 11/2012 | Shore .................... G06Q 30/02 348/207.1 |
| 2013/0013416 A1* | 1/2013 | Stein .................. G06Q 30/0251 705/14.66 |
| 2013/0030909 A1* | 1/2013 | Shih ....................... G06Q 50/01 705/14.48 |
| 2013/0046621 A1* | 2/2013 | Asseoff et al. ............ 705/14.51 |
| 2013/0058104 A1* | 3/2013 | Catalano ................... F21V 5/04 362/335 |
| 2013/0185127 A1* | 7/2013 | Roden ........................ 705/14.19 |
| 2013/0197992 A1* | 8/2013 | Bao ............................ 705/14.43 |
| 2013/0325572 A1* | 12/2013 | Plut ............................ 705/14.16 |
| 2013/0332263 A1* | 12/2013 | Vora .................. G06Q 30/0245 705/14.44 |
| 2014/0019225 A1* | 1/2014 | Guminy et al. ........... 705/14.39 |
| 2014/0058826 A1* | 2/2014 | Ogawa ....................... 705/14.43 |
| 2014/0214553 A1* | 7/2014 | Aarabi ....................... 705/14.67 |

\* cited by examiner

EARNED MEDIA GENERATION

RELATED DOCUMENTS

The present application claims priority under 35 U.S.C. §119(e) to U.S. Provisional Application No. 61/681,464 filed Aug. 9, 2012, to Trygve Jensen, and entitled "Social Campaign Website," which application is hereby incorporated by reference in its entirety.

BACKGROUND

Marketing is used to encourage an audience to take action. Marketing can generally be divided into three categories: owned, paid, and earned. Owned marketing refers to advertising that is owned by the marketer such as the marketer's webpage, blog, or Twitter account. Paid advertising refers to instances where payment is made to leverage a channel not owned by the marketing entity. Classical examples of paid marketing are paying for a bill board display, sponsorships, and internet display advertisements.

Earned advertising refers to instances where the customers themselves become the marketing channel. Earned media includes word-of-mouth advertising, buzz, and "viral" media. Earned media is often the most credible of all marketing tools and plays a key role in most sales. In many instances, the distribution of earned media is from person-to-person through pre-existing relationship channels. This lends a superior level of trustworthiness to the communication. Earned media often is a result of well-executed owned and paid media. However, earned media has a reputation of being hard to scale, difficult to control, and challenging to measure. Customers can be unpaid or paid for generating earned media.

Social media has emerged as a key medium for marketing and plays a particularly significant role in earned media. Social media includes interactive platforms that allow individuals, businesses, and communities to create and share content. Social media technologies include blogs, picture sharing, video blogs, wall postings, email, social websites, instant messaging, music sharing, crowd sourcing, and voice over IP, to name a few.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Marketing is used to encourage an audience to take action. For example, marketing by a retail organization may attempt to persuade the audience to purchase a product, while marketing by a political candidate may encourage the audience to vote for or support a position of the candidate.

As discussed above positive earned media is typically the most credible type of marketing. Earned media is one desired result of paid and owned media. Examples of paid media include a Super Bowl ad or a banner ad on a website. Examples of owned media include websites and blogs maintained by a company. Earned media results when people engage with either paid or owned media and then spread information about their engagement. For example, a non-profit organization advertises in a television ad (paid media) that they are collecting donations for hurricane victims via their website (owned media). Viewers are encouraged to visit the website and donate. After a viewer donates on the website (engagement) they are asked to share their experience with their social network (learned media).

Earned media is highly valued by marketers because of its effectiveness. For example, most people are much more likely to buy a product if a friend recommends it to them than if they see an advertisement or webpage advertising the product. Earned media is typically perceived as more authentic than paid or owned media. Earned media is often the most valuable media, but it is also often the hardest to measure, scale, and control.

As used in the specification and appended claims, the term "earned media" is used broadly. By way of example and not limitation, "earned media" may be media that is generated or disseminated by consumers that do not have any direct responsibility to the marketer, such as with social sharing through blogs, social networking sites, email, viral videos, work of mouth, new articles, editorials, etc.

Social media has emerged as a key driver of earned media. Social media includes interactive platforms that allow individuals and communities to create and share content. For example, social media may include collaborative projects (such as wikis), blogs and microblogs (such as Twitter®), content communities (such as YouTube®) social networking sites such as Facebook®), virtual game worlds such as World of Warcraft®), and virtual social worlds (such as Second Life®). Social media technologies include blogs, picture sharing, video blogs, wall postings, email, instant messaging, music sharing, crowd sourcing and voice over IP, to name a few.

A social media network is a social structure of ties between a set of participants using social media technologies. For example, people often form or join social networks and create ties that include their friends, family members, coworkers, acquaintances, business contacts, users with similar interests or backgrounds, and organizations they support. Through these connections users share information such as photos of outings with family and friends, stories of events happening in their lives, links to websites and videos, opinions about current events, and pictures of products they like.

A social media user may use several social media platforms. For example, a user's Twitter social network includes both the Twitter accounts that the user follows and the Twitter accounts that follow the user. The user may also be part of the Facebook social network that includes the users "friends." If the user maintains a blog, it may be a social media platform for those who read the blog and participate in discussion hosted by the blog.

Marketers would like to take advantage of the trusted relationships and high connectedness that may exist on social media platforms to generate earned media. The description below teaches a number of principles, systems, and methods that allow for scaling, control, and measurement of earned media in social networks.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

The principles described herein may be embodied as a system, method or computer program product. The principles may take the form of an entirely hardware implementation, an implementation combining software and hardware aspects, or an implementation that includes a computer program product that includes one or more computer readable storage medium(s) having computer readable program code embodied thereon. Any combination of one or more computer readable storage medium(s) may be utilized. In the context of this document, a computer readable storage medium may be any tangible medium that can contain, or store a program for use by or in connection with an instruction execution system, apparatus, or device. Computer program code for carrying out operations according to the principles described herein may be written in any suitable programming language. Program code embodied on a computer readable medium may be transmitted using any appropriate medium, including but not limited to wireless, wireline, optical fiber cable, RF, etc., or any suitable combination of the foregoing.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. In the context of this document, a computer readable storage medium may be any tangible medium that can contain, or store a program for use by or in connection with an instruction execution system, apparatus, or device.

Figure 1:
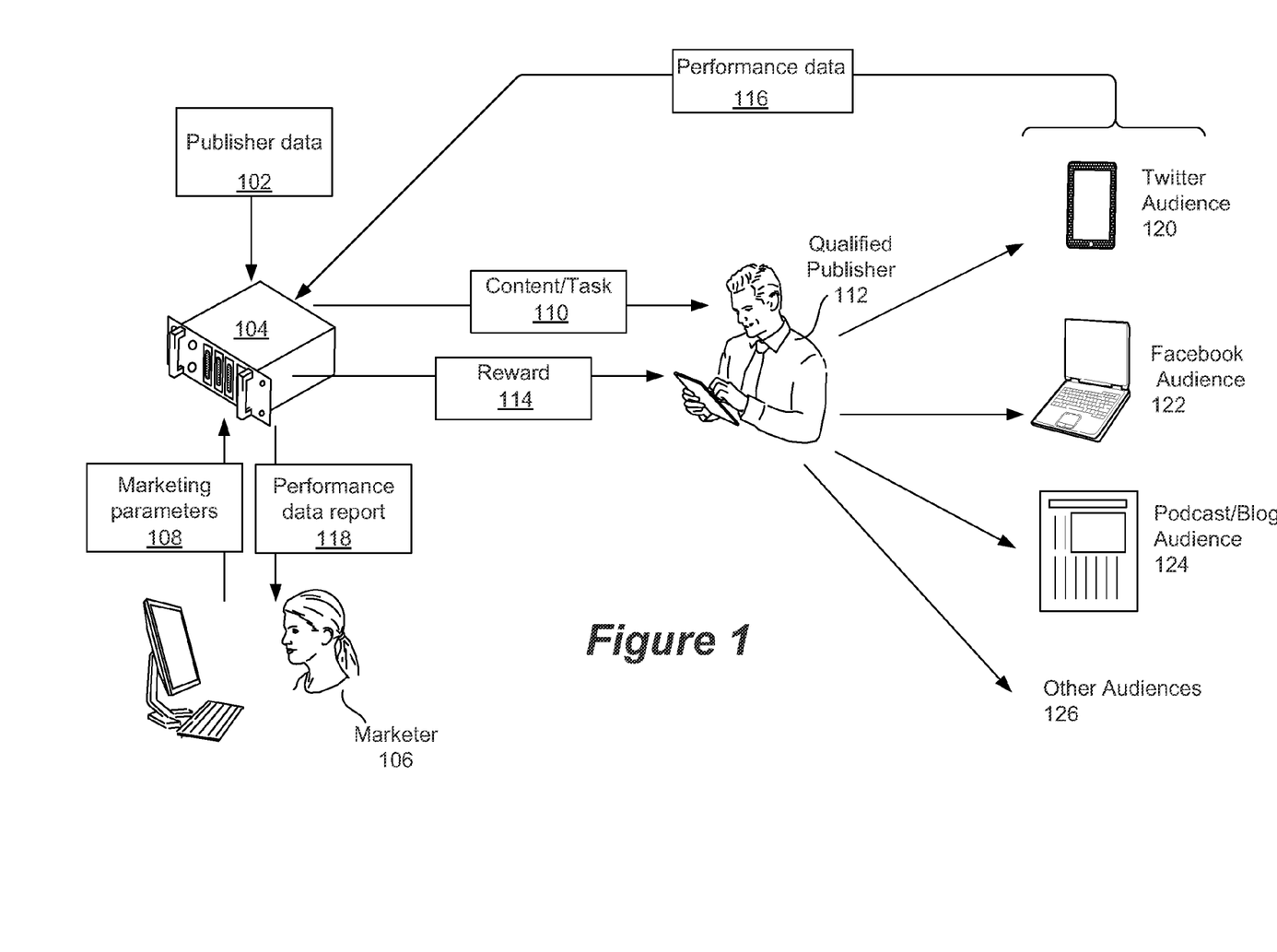
FIG. 1 is a diagram of and illustrative system for generating earned media, according to one example of principles described herein.

FIG. 1 is a diagram of a system for generating earned media. This example includes a marketer (106), which represents some entity that wants to generate earned media and publishers (112), which represents social media users who are willing to help generate earned media in return for some type of reward (114). The marketer and publishers interface through a unified portal (104) which may be, for example, a website hosted on a server with a database. As used in the specification and appended claims, the term "publisher" is used broadly. By way of example and not limitation, a "publisher" may be social media users, bloggers, members of the press, or any other person or entity who shares, communicates, publicizes, reports, posts, broadcasts, distributes, disseminates, circulates, reveals, divulges, or leaks information. Publishers may be paid or unpaid. Publishers themselves and/or the publisher's social network may constitute the intended audience for a marketer.

Publisher data (102) describes various characteristics of the publishers and is stored on the unified portal (104). The publisher data (102) is used by the system to allow a marketer to select specific publishers to disseminate the marketer's content. This allows the marketer some amount of control over at least the initial distribution of their content. The publisher data (102) may be collected from a variety of sources such as publisher interviews, social network profile information, demographics, social influence, follower characteristics, retrieved from sources on the Internet or some other communications network are stored on the unified portal (104). For example, the publisher data (102) may include age, sex, location, income, purchase behavior, etc. of the publishers. One significant aspect that may be included in the publisher data (102) may be a measure of performance of the publisher on previous marketing campaigns. These performance measures may include audience size, click through rates, product purchases by the audience, message tone, or other factors.

To begin a marketing campaign, a marketer provides a number of marketing parameters (108) including the content/task to be performed and target publisher/audience information. In many instances, the target publisher and target audience information may be the same. For example, the marketer may be trying to reach male sports enthusiasts between 25 and 35. A 30 year old male publisher with a strong interest in sports will probably have a significant number of social connections (the audience) with similar characteristics. Thus, by selecting/filtering publishers according to the target audience parameters, there is a high amount of confidence that the target audience can be reached through the selected publishers.

Additionally or alternatively, the marketing parameters (108) may have parameters that relate directly to publishers such as: the desired size of the publisher's network, the effectiveness of the publisher in achieving the desired action by members of the audience, and other factors. Publishers who meet the parameters are called qualified publishers.

Content and/or tasks (110) from the publisher are presented through the unified portal only to the qualified publishers (112). The qualified publishers then perform the desired task (such as viewing a movie trailer, filling out a survey, reviewing a website/product) and then pass on their comments/evaluation to their audience. Content and/or tasks may include tasks such as social sharing, downloading, taking a survey, making a subscription, and creating an account and content such as videos, links, and images. For example, a qualified publisher with a sports interest may be selected to view a trailer for an upcoming sports themed action movie and then send out a Tweet to his Twitter audience (120) saying "You got see this new film by producer X. It is stunning! See the trailer at 'link'." The qualified publisher (112) may click on a Facebook "Like" or "Recommend" button on the marketer's website. This generates a link/story that appears on the qualified publisher's timeline, in a ticker and/or News Feed. The publisher then distributes the content to the qualified publisher's Facebook audience (122). Similarly, the qualified publisher (112) may post their review with a link to the trailer a blog to reach their podcast/blog audience (124). The qualified publisher may also reach out to a number of other audiences (126).

Publisher performance data (116) is collected and stored on the unified portal and a performance data report (118) may be communicated to the marketer (106) from the unified portal. Publisher performance data may include any of a number of parameters, including page views, clicks, audience engagement, platforms the audience was using at the time of the click, location data, and a variety of other information. This information is collected across multiple social media platforms to give a holistic view of the influence of the qualified publisher(s). As discussed below, in some implementations, the performance data may be on a per publisher basis. This allows the performance of each individual publisher to be tracked and the reward (114) provided to each publisher to be based on their actual performance.

Figure 2:
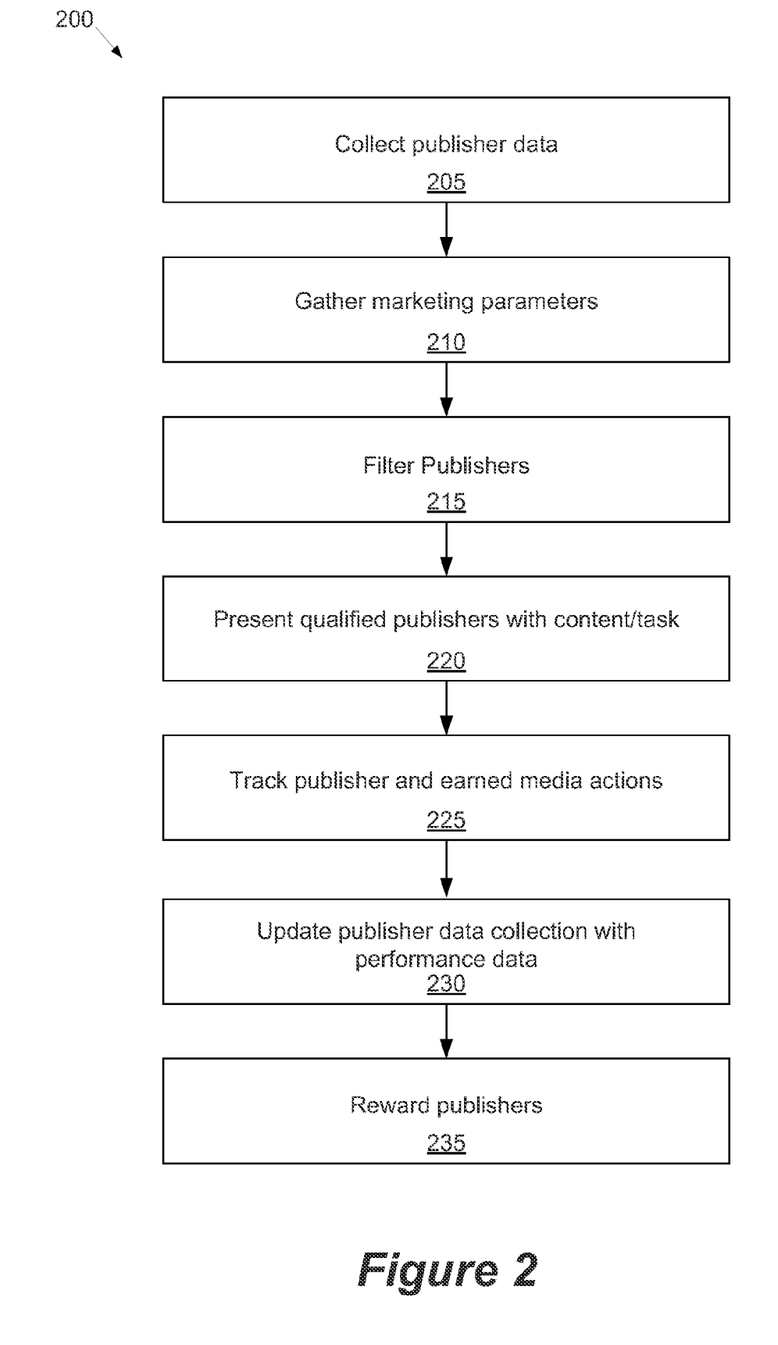
FIG. 2 is a flowchart of an illustrative method for generating earned media, according to one example of principles described herein.

FIG. 2 is an illustrative method (200) for generating earned media. In this example, marketers and publishers may interface through a unified portal, that is, a service dually purposed to allow marketers to find publishers and publishers to receive offers from marketers. On this portal, publisher descriptor data is collected on/from publishers and stored in a computer readable memory (step 205). As discussed above, this data may include interviews, social network profile information, demographics, social influence, follower characteristics, etc. For example, data from one publisher, "P" may include that the publisher is a twenty-five year-old female from Provo, Utah, has a thousand friends on Facebook, has two hundred and fifty followers on Twitter, seven hundred followers on Pinterest, writes a blog about gourmet chocolate with ten thousand weekly page views, and likes cooking, gourmet chocolate, and cats. In some implementations, it could also be determined that the average age of her Facebook friends is 27, that 80% of them are female and that the majority of her friends live in the western United States.

Through the portal, marketing parameters are gathered from marketers and stored on the computer readable memory (step 210). For example, the marketing parameter may be target audience demographic criteria such as age, sex, location, income, purchase behavior, etc. A marketer "M" uses these parameters to choose their target audience/publishers. An example of marketing parameters for selecting publishers may read as follows: 19 to 35 year-old females in the Western United States who have interests in or have bought gourmet chocolate in the past and are also well connected i.e. have more than fifteen hundred connections on social networks.

A computing device retrieves the descriptor data and the marketing parameter(s) and filters the publishers by applying the at least one marketing parameter to the descriptor data to produce a pool of qualified users (step 215). Following the examples above, publisher P would pass through the filter defined by the parameters given by marketer M, while a fifteen year-old male would not meet the criteria to pass through the filter. In some implementations additional filters may be applied after the content or task has gone out to the publishers. For example, if a marketer notices that a particular publisher is receiving an unreasonable amount of rewards and the publisher's activity looks questionable, the marketer can choose to filter that publisher or a demographic of publishers from receiving any more rewards.

The tasks and/or content are then presented by the computing device to the qualified publishers (step 220) in an effort to generate earned media. Publishers may be offered an award and/or compensation for completing a task. Examples of tasks include social sharing, download, survey, subscription, and creating an account. With social sharing, a publisher may be asked to take the marketer's content, for example, a link to a video about its award-winning gourmet chocolate, and share it with their connections in their social network. With a download, the publisher may be asked to download something, for example, a mobile application may be downloaded to the publisher's mobile device that allows users to build their own custom arrangement of gourmet chocolates and share that arrangement with their social network connections or to buy the arrangement and offer a coupon to their social network for buying the same arrangement.

With surveys, the publisher may be asked to take a survey on, for example, favorite types of gourmet chocolate, and share that survey with social network connections. With subscriptions, the publisher may be asked to subscribe to a newsletter, magazine, etc., for example, a newsletter that talks about the latest trends in chocolate making and to share a link to the newsletter signup with social network connections.

As publishers take action to complete tasks and share content, the publisher's actions plus any earned media actions are tracked (step 225). One example of tracking includes links with embedded JavaScript code. For example, publisher P receives the task of downloading a mobile application for making gourmet chocolate arrangements, making an arrangement in the application, and sharing that arrangement and application download with her social network. Because she is rewarded for each time her arrangement is shared and each time someone downloads the application, she tries to reach the largest audience she can. She takes the arrangement and mobile application tracking links and posts them on her Facebook wall, pins them on Pinterest, tweets about them on Twitter, and writes a blog post about them on her blog. Each time someone clicks on one of the links the embedded JavaScript records the click and on which platform the link was clicked then reports that back to the unified portal. Some readers of publisher P's blog may enjoy making gourmet chocolate arrangements and share the link with people in their social networks. Each click made by these shares is also recorded through the link and so on.

The publisher data collection is updated with the performance data (230) collected from tracking the publisher's sharing. Examples of performance data include the publisher's reach and influence. Reach may include the demographics of the people the publisher shares with. Influence may include how effective a share from the publisher is in engaging people in their network to generate earned media. For example, audience engagement with the content presented by the qualified publisher can be tracked across multiple social media platforms. Various measures such as a publisher effectiveness ranking can be created based on the tracking of the audience engagement. These measures can be used to improve the filtering of publishers for future marketing efforts. For example, the marketing parameter provided by the marketer may include a publishing effectiveness threshold such as a minimum acceptable reach or influence.

Publishers are rewarded (step 235) for completing tasks and generating earned media. Examples of rewards include, reward points for each click that can be redeemed for consumer products, cash based on how many downloads were made, and a special status with the company allowing purchases of items at a lower cost and/or before they are available to the general public.

Because the greatest amounts of awards are won when a publisher's network generates earned media, publishers have an incentive to be genuine. If a publisher merely spams their social network with any marketing task/content available to them, connections in their network are likely to catch on to the publisher's lack of true interest in what he or she is sharing and stop paying attention to their sharing out or even block them. So, incentives for publishers lie in accepting tasks/content to share that they are truly interested in and that they and people in their network can engage with. In addition, publishers who merely spam tasks/content can be detected by reviewing their respective performance data. If a publisher, for example, has shared many tasks, but has very little success in people engaging in these tasks, this may be an indicator of a spammer. Encouraging genuine sharing and filtering spammers adds value for marketers because the quality of sharing improves and earned media is more likely to be generated.

Marketers also benefit from an increased ability to measure, scale and control earned media. Marketers can measure the effects of their efforts to generate earned media by analyzing tracking data from tasks/content shared by publishers. Knowing which tasks/content, coupled with which filtered pool of publishers, works best for generating earned media, marketers can confidently scale their marketing efforts. Marketers can have more control over earned media by choosing their own content and tasks that they wish to generate it with. They can also control the initial scale of the earned media by selecting the number/type of publishers that the content is provided to.

Figure 3:
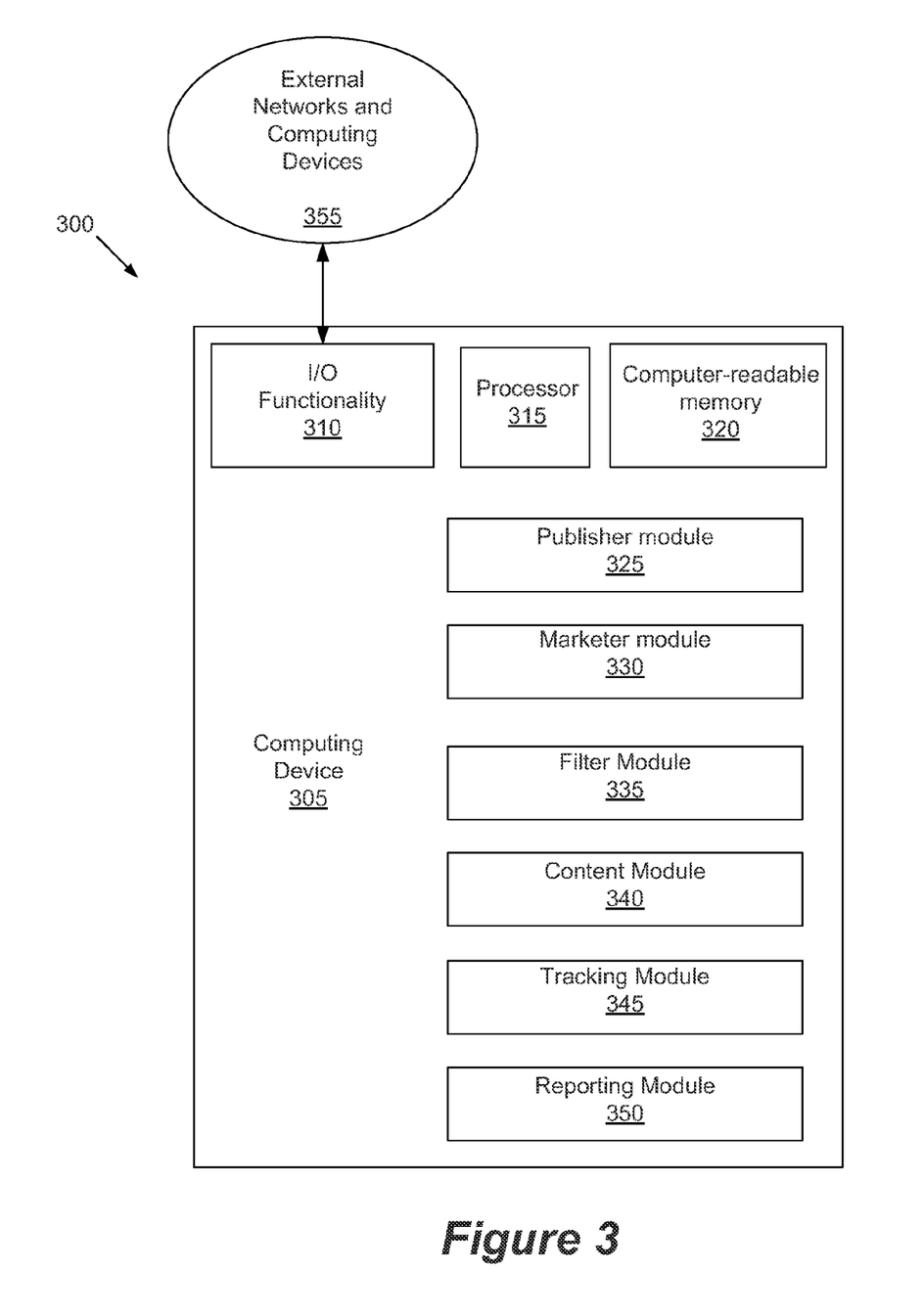
FIG. 3 is a block diagram of a system for generating earned media, according to one example of principles described herein.

FIG. 3 is a block diagram of an illustrative system (300) for generating earned media. The system includes a computer-readable memory (320) for storing instructions and data, a computer processor (315) for retrieving and executing the instructions, and I/O functionality for communication with external networks and computing devices (355). The system (300) is illustrated as including a single computing device (305). However, the system may include any number of computing devices, mass storage elements, networks, and modules that are appropriately interconnected to produce the functionality of the modules described below. For example, the system may be implemented as a web portal with supporting back end functionality such as control panels, databases, and logical/analysis operations. The system, regardless of its composition or sub-components, acts to create the unified portal described above.

When executed, the instructions implement a publisher module (325) to collect publisher descriptor data describing publishers. For example, the publisher module (325) may collect data directly from the publishers by using questionnaires, behavior tracking, or other techniques. Examples of data that may be obtained directly from a publisher include the publishers name, account information, age, sex, preferences, status, income, and other information. The publisher module (325) may also access other external sources of descriptor data. For example, the publisher module (325) may request permission from the publishers to access and analyze their social media accounts, including Facebook accounts. This may allow the publisher module to observe the size, composition, and responsiveness of the publisher's audience.

For publishers that have participated in a number of earned media campaigns a significant publisher descriptor may be the actual performance of the publisher. For example, one publisher may have been particularly successful in distributing content related to an upcoming action movie release. Data describing this success may be included in the publisher descriptor data and utilized by marketers in evaluating the publisher.

The system also includes a marketer module (330) to receive marketing parameters from a marketer. The marketing module may receive marketing parameters from the marketer in a variety of ways including through direct interaction with the marketer, through a web page used by the marketer, through a dashboard implemented on the unified portal, or through any other appropriate means. As discussed above, the marketing parameters may include a description of the audience the marketer desires to reach, including restrictions about which publishers the marketer wants to publish the information. A publisher's audience typically shares one or more characteristics with the publisher. For example, a young mother may write a blog on parenting. It can be accurately assumed that most of the audience of the blog is also mothers. Consequently, by defining characteristics of a target audience, the marketer can select publishers that fall into the target audience and assume that a substantial portion of the publisher's audience also falls into the target audience. In other cases, the publisher module (325) may have collected at least some data directly quantifying the characteristics of the publisher's audience. This information can then be used in addition to, or in the place of, the individual characteristics of the publisher.

A filter module (335) applies the marketing parameters to the publisher descriptor data to filter out unsuitable publishers and to output a pool of qualified publishers. A content module (340) presents qualified publishers with tasks from the marketer. These tasks may be any of the tasks or content described above. For example, the content module may accept content from the marketer and reformat/repackage the data into a form that is easily distributed to the qualified publishers and easily distributed by the qualified publishers to their audiences. In one implementation, the content module adds a mechanism for tracking the content and audience engagement with the content. In one example, this mechanism provides for tracking on a per publisher basis so that the individual publishers can be rewarded according to performance. As discussed above, this mechanism may include an individualized link with embedded JavaScript.

A tracking module (345) tracks actions of qualified publishers in performing the task and also tracks responses from the audience. A reporting module (350) reports data from the tracking module to the marketer and the publisher. For example, the reporting module (350) may provide data to drive a dashboard showing real time or near real time results during a marketing campaign. This allows the marketer and/or publisher to adjust strategies during the campaign. The data from the reporting module may also be archived and used for a variety of purposes including research, archiving, and determining the overall effectiveness of the selected publishers and the campaign as a whole.

The system described above is only one example. A variety of different systems could be used to implement the principles described herein. For example, the modules described above could be combined, deleted, or reordered. Additionally, a number of additional modules could be implemented. For example, a reward module could be implemented to reward qualified publishers according to the response from an audience reached by the qualified publishers. The modules may also perform additional functions that are not explicitly discussed above. For example, the tracking module may be used to generate a publisher effectiveness score for each publisher based on an engagement from an audience of each specific publisher.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for generating earned media comprising:
   collecting, with a computing device, publisher descriptor data from a plurality of publishers and storing the descriptor data in a computer-readable memory;
   gathering, with the computing device, at least one marketing parameter from a marketer and storing the at least one marketing parameter on the computer-readable memory;
   retrieving, with the computing device, the descriptor data and the at least one marketing parameter from the computer-readable memory;
   filtering, with the computing device, the plurality of publishers by applying the at least one marketing parameter to the descriptor data to produce qualified publishers;
   presenting, with the computing device, the qualified publishers with content from the marketer for dissemination to an audience of the qualified publishers;
   tracking, with the computing device, actions of the qualified publishers related to dissemination of the content to the audience;
   tracking, across multiple social media platforms with the computing device, each response from the audience to the content presented by the qualified publishers on a per qualified publisher basis by including a publisher specific link with an embedded tracking script in the content from the marketer;
   generating, with the computing device, a publisher effectiveness ranking for each qualified publisher based on the tracking of the audience response on a per qualified publisher basis, wherein the at least one marketing parameter comprises a publisher effectiveness threshold; and
   rewarding, with the computing device, qualified publishers according to publisher effectiveness and a number of responses from the audience.

2. The method of claim 1, wherein the embedded tracking script:
   records each engagement with the content;
   records which platform the engagement occurred on; and
   reports to the computing device the engagement and the platform.

3. The method of claim 1, wherein collecting the publisher descriptor data comprises collecting audience data from social networking accounts of publishers.

4. The method of claim 3, wherein collecting the audience data comprises collecting demographic data of an audience of a publisher on a social networking site.

5. The method of claim 1, wherein the at least one marketing parameter comprises target audience demographic criteria and filtering the plurality of publishers comprises applying the target audience demographic criteria to the plurality of publishers, wherein publishers falling into the target audience demographic are qualified publishers.

6. The method of claim 1, wherein presenting the qualified publishers with content from the marketer comprises a task.

7. The method of claim 6, wherein the task comprises evaluation of a product, service, or information from the marketer and sharing the evaluation by the qualified publisher with a social media audience, wherein the evaluation comprises a publisher specific content with the embedded tracking script.

8. A method for generating earned media comprising:
   collecting, with a computing device, publisher descriptor data from a plurality of publishers and storing the descriptor data in a computer-readable memory;
   gathering, with the computing device, at least one marketing parameter from a marketer and storing the at least one marketing parameter on the computer-readable memory;
   retrieving, with the computing device, the descriptor data and at least one marketing parameter from the computer-readable memory;
   filtering, with the computing device, the plurality of publishers by applying the at least one marketing parameter to the descriptor data to identify qualified publishers;
   presenting, with the computing device, the qualified publishers with content from the marketer for dissemination to an audience of the qualified publishers;
   tracking, with the computing device, actions of the qualified publishers related to dissemination of the content to the audience;
   tracking, across multiple social media platforms with the computing device, each response from the audience to the content presented by the qualified publishers on a per qualified publisher basis by including a publisher specific link with an embedded tracking script in the content from the marketer, wherein the embedded tracking script records each engagement with the content, records which platform the engagement occurred on, and report to the computing device the engagement and the platform;
   generating, with the computing device, a publisher effectiveness ranking for each qualified publisher based on the tracking of the audience response on a per qualified publisher basis, wherein the at least one marketing parameter comprises a publisher effectiveness threshold; and
   rewarding, with the computing device, qualified publishers according to publisher effectiveness and a number of responses from the audience.

9. A system for generating earned media comprising:
   a computer-readable memory storing instructions;
   a computer processor for retrieving and executing the instructions to perform:
   collecting publisher descriptor data from a plurality of publishers and storing the descriptor data in the computer-readable memory;

gathering at least one marketing parameter from a marketer and storing the at least one marketing parameter on the computer-readable memory;

retrieving the descriptor data and the at least on marketing parameter from the computer-readable memory;

filtering the plurality of publishers by applying the at least one marketing parameter to the descriptor data to produce qualified publishers;

presenting the qualified publishers with content from the marketer for dissemination to an audience of the qualified publishers;

tracking actions of the qualified publishers related to the dissemination of the content to the audience;

tracking across multiple social media platforms each response from the audience to the content presented by the qualified publishers on a per qualified publisher basis by including a publisher specific link with an embedded tracking script in the content from the marketer;

generating a publisher effectiveness ranking for each qualified publisher based on the tracking of the audience response on a per qualified publisher basis, wherein the at least one marketing parameter comprises a publisher effectiveness threshold; and rewarding qualified publishers according to publisher effectiveness and a number of responses from the audience.

10. The system of claim 9, wherein the embedded tracking script reports actions taken on the link by the audience to the tracking module.

11. The system of claim 9, wherein the embedded tracking script:
records each engagement with the content;
records which platform the engagement occurred on; and
reports to the computing device the engagement and the platform.

12. The system of claim 9, wherein collecting the publisher descriptor data comprises collecting audience data from social networking accounts of publishers.

13. The system of claim 12, wherein collecting the audience data comprises collecting demographic data of an audience of a publisher on a social networking site.

14. The system of claim 9, wherein the at least one marketing parameter comprises target audience demographic criteria and filtering the plurality of publishers comprises applying the target audience demographic criteria to the plurality of publishers, wherein publishers falling into the target audience demographic are qualified publishers.

15. The system of claim 9, wherein presenting the qualified publishers with content from the marketer comprises a task comprising evaluation of a product, service, or information from the marketer and sharing the evaluation by the qualified publisher with a social media audience, wherein the evaluation comprises a publisher specific content with the embedded tracking script.

16. A computer program product for generating earned media, the computer program product comprising:
a non-transitory computer readable storage medium having computer readable program code embodied therewith;
a processor that executes the computer readable program code to perform:
collecting publisher descriptor data from a plurality of publishers and storing the descriptor data in a computer-readable memory;
gathering at least one marketing parameter from a marketer and storing the at least one marketing parameter on the computer-readable memory;
retrieving the descriptor data and the at least one marketing parameter from the computer-readable memory;
filtering the plurality of publishers by applying the at least one marketing parameter to the descriptor data to product qualified publishers;
presenting the qualified publishers with content from the marketer for dissemination to an audience of the qualified publishers;
tracking actions of the qualified publishers related to dissemination of the content to the audience;
tracking across multiple social media platforms each response from the audience to the content presented by the qualified publishers on a per qualified publisher basis by including a publisher specific link with an embedded tracking script in the content from the marketer;
generating a publisher effectiveness ranking for each qualified publisher based on the tracking of the audience response on a per qualified publisher basis, wherein the at least one marketing parameter comprises a publisher effectiveness threshold; and
rewarding qualified publishers according to publisher effectiveness and a number of responses from the audience.

17. The program product of claim 16, wherein the embedded tracking script:
records each engagement with the content;
records which platform the engagement occurred on; and
reports to the computing device the engagement and the platform.

18. The program product of claim 16, wherein collecting the publisher descriptor data comprises collecting audience data from social networking accounts of publishers.

19. The program product of claim 18, wherein collecting the audience data comprises collecting demographic data of an audience of a publisher on a social networking site.

20. The program product of claim 16, wherein the at least one marketing parameter comprises target audience demographic criteria and filtering the plurality of publishers comprises applying the target audience demographic criteria to the plurality of publishers, wherein publishers falling into the target audience demographic are qualified publishers.

* * * * *